United States Patent
Weller et al.

(10) Patent No.: US 8,869,105 B2
(45) Date of Patent: Oct. 21, 2014

(54) EXTENSIBILITY INTEGRATED DEVELOPMENT ENVIRONMENT FOR BUSINESS OBJECT EXTENSION DEVELOPMENT

(75) Inventors: Joerg Weller, Wieblingen (DE);
Reinhold Kautzleben, Karlsruhe (DE);
Gregor Karl Frey, Lorsch (DE);
Roland Brechter, St. Leon-Rot (DE);
Johann Kemmer, Muehlhausen (DE);
Daniel Wachs, Mannheim (DE);
Thomas Schneider, Heidelberg (DE)

(73) Assignee: SAP AG, Walldorf (DE)

( * ) Notice: Subject to any disclaimer, the term of this patent is extended or adjusted under 35 U.S.C. 154(b) by 135 days.

(21) Appl. No.: 13/299,084

(22) Filed: Nov. 17, 2011

(65) Prior Publication Data

US 2013/0132929 A1    May 23, 2013

(51) Int. Cl.
*G06F 9/44* (2006.01)
*G06Q 10/06* (2012.01)

(52) U.S. Cl.
CPC . *G06Q 10/06* (2013.01); *G06F 8/70* (2013.01)
USPC ............ 717/113; 717/105; 717/109; 717/125

(58) Field of Classification Search
USPC .......................................................... 717/113
See application file for complete search history.

(56) References Cited

U.S. PATENT DOCUMENTS

| | | | |
|---|---|---|---|
| 6,014,670 A * | 1/2000 | Zamanian et al. .................... 1/1 |
| 6,366,917 B1 * | 4/2002 | St. John Herbert, III ............. 1/1 |
| 6,788,317 B2 * | 9/2004 | Gardas et al. ................. 715/762 |
| 6,868,427 B2 * | 3/2005 | Herzog et al. ........................ 1/1 |
| 6,999,963 B1 * | 2/2006 | McConnell ........................... 1/1 |
| 7,284,005 B1 * | 10/2007 | Wiryawan et al. .................... 1/1 |
| 7,499,943 B2 * | 3/2009 | Hobbs ................................. 1/1 |
| 7,505,983 B2 * | 3/2009 | Wildhagen et al. ........... 707/791 |
| 7,797,627 B2 * | 9/2010 | Fong et al. .................... 715/249 |
| 8,280,923 B2 * | 10/2012 | Robertson et al. ............ 707/805 |
| 2003/0041095 A1 * | 2/2003 | Konda et al. .................. 709/201 |
| 2004/0034848 A1 * | 2/2004 | Moore et al. .................. 717/117 |
| 2004/0088678 A1 * | 5/2004 | Litoiu et al. .................. 717/104 |
| 2004/0090458 A1 * | 5/2004 | Yu et al. ........................ 345/760 |
| 2005/0015732 A1 * | 1/2005 | Vedula et al. ................. 715/805 |
| 2007/0110233 A1 * | 5/2007 | Polk et al. ....................... 380/30 |
| 2007/0112835 A1 * | 5/2007 | McMullen et al. ........... 707/102 |
| 2007/0226751 A1 * | 9/2007 | Brendle et al. ................ 719/313 |
| 2007/0271107 A1 * | 11/2007 | Fiedler et al. ..................... 705/1 |
| 2007/0299704 A1 * | 12/2007 | Wildhagen et al. .............. 705/7 |
| 2008/0243895 A1 * | 10/2008 | Musteata et al. ............. 707/101 |
| 2009/0164414 A1 * | 6/2009 | Tatzel et al. ...................... 707/2 |

(Continued)

*Primary Examiner* — Don Wong
*Assistant Examiner* — Marina Lee
(74) *Attorney, Agent, or Firm* — Mintz Levin Cohn Ferris Glovsky and Popeo, P.C.

(57) ABSTRACT

In one aspect, there is provided a computer-implemented method. The method may including selecting an existing business object for extension in an extensibility integrated development system; generating, in the extensibility integrated development system, a page highlighting one or more nodes of the existing business object to allow selection of the one or more nodes for modification; selecting, in the extensibility integrated development system, at least one of the one or more nodes, when highlighted; modifying, in the extensibility integrated development system, the selected one or more nodes by adding at least one attribute to the at least one of the selected one or more nodes; and storing, in a repository, the modified node including the added at least one attribute. Related apparatus, systems, methods, and articles are also described.

14 Claims, 6 Drawing Sheets

(56) References Cited

U.S. PATENT DOCUMENTS

| | | | |
|---|---|---|---|
| 2010/0057776 A1* | 3/2010 | Baeuerle et al. | 707/104.1 |
| 2010/0088391 A1* | 4/2010 | Brunswig et al. | 709/217 |
| 2012/0060141 A1* | 3/2012 | Demant et al. | 717/101 |
| 2013/0104100 A1* | 4/2013 | Mueller | 717/106 |
| 2013/0132929 A1* | 5/2013 | Weller et al. | 717/113 |

* cited by examiner

```
import BASIS.Global;
import AP.CRM.Global;

[Extension] businessobject AP.CRM.Global:SalesOrder {
    element ExtRoot1:Text;
    element ExtRootLink:WebURI;
    node Item {
        element ExtItem1:Text;
    }
}
```

The key words of this language refer to business entities, e.g.
- Businessobject
- Element (= extension field)
- Node (= BO node)

FIG. 3

EXTENSIBILITY INTEGRATED DEVELOPMENT ENVIRONMENT FOR BUSINESS OBJECT EXTENSION DEVELOPMENT

FIELD

The present disclosure generally relates to data processing.

BACKGROUND

A business application may be used in connection with a business process. When this is the case, the business application may implement the business processes by modeling business data as structured data object used in connection with the business process. A business object is an example of such structured data. The business object(s) may be presented, or made available, via a user interface (e.g., as a user interface presenting a form, a report, and the like).

To facilitate implementation, a business application may be provided to an entity, such as a user, with a predetermined set of business objects. As noted, the business application may be used in connection with the business process, which may access (and/or generate) business data structured as a business object. A business object may be implemented as an object representing a business domain supported by the business application. For example, a sales order entry business application may have one or more business objects associated with the sales order entry process (e.g., sales orders, line items, and sales orders being processed, deliveries of items ordered, revenue, and the like). The business object may also include methods (e.g., one or more functions and/or business logic) and data (e.g., attributes), which may also provide standardized, domain-specific access interfaces to the data and/or methods. Business objects may be associated with other business objects to enable exchanges of information among the business objects.

SUMMARY

In one aspect, there is provided a computer-implemented method. The method may include selecting an existing business object for extension in an extensibility integrated development system; generating, in the extensibility integrated development system, a page highlighting one or more nodes of the existing business object to allow selection of the one or more nodes for modification; selecting, in the extensibility integrated development system, at least one of the one or more nodes, when highlighted; modifying, in the extensibility integrated development system, the selected one or more nodes by adding at least one attribute to the at least one of the selected one or more nodes; and storing, in a repository, the modified node including the added at least one attribute.

In some implementations, one of more variations may be made as well as described in the detailed description below and/or as described in the following features. The existing business object may be selected at a user interface from a repository including a plurality of business objects delivered with an enterprise resource planning system. The extensibility integrated development system may generate a hyper text markup language page highlighting the one or more nodes of the existing business object, when configured during design time to allow selection and modification. An indication of a selection of at least one of the highlighted one or more nodes may be received from a user interface. A data type attribute may be added to the at least one of the highlighted nodes. An item may be added to the at least one of the highlighted nodes. The extensibility integrated development system may include a script-based editor coupled to a metadata repository. The extensibility integrated development system may include a script-based editor coupled to a metadata repository and a language service for providing the highlighting.

It is to be understood that both the foregoing general description and the following detailed description are exemplary and explanatory only and are not restrictive. Further features and/or variations may be provided in addition to those set forth herein. For example, the implementations described herein may be directed to various combinations and subcombinations of the disclosed features and/or combinations and subcombinations of several further features disclosed below in the detailed description.

DESCRIPTION OF THE DRAWINGS

In the drawings,

FIG. 3 depicts example pages showing the extensibility integrated development environment enabling modification of the extended business object;

Figure 1A:
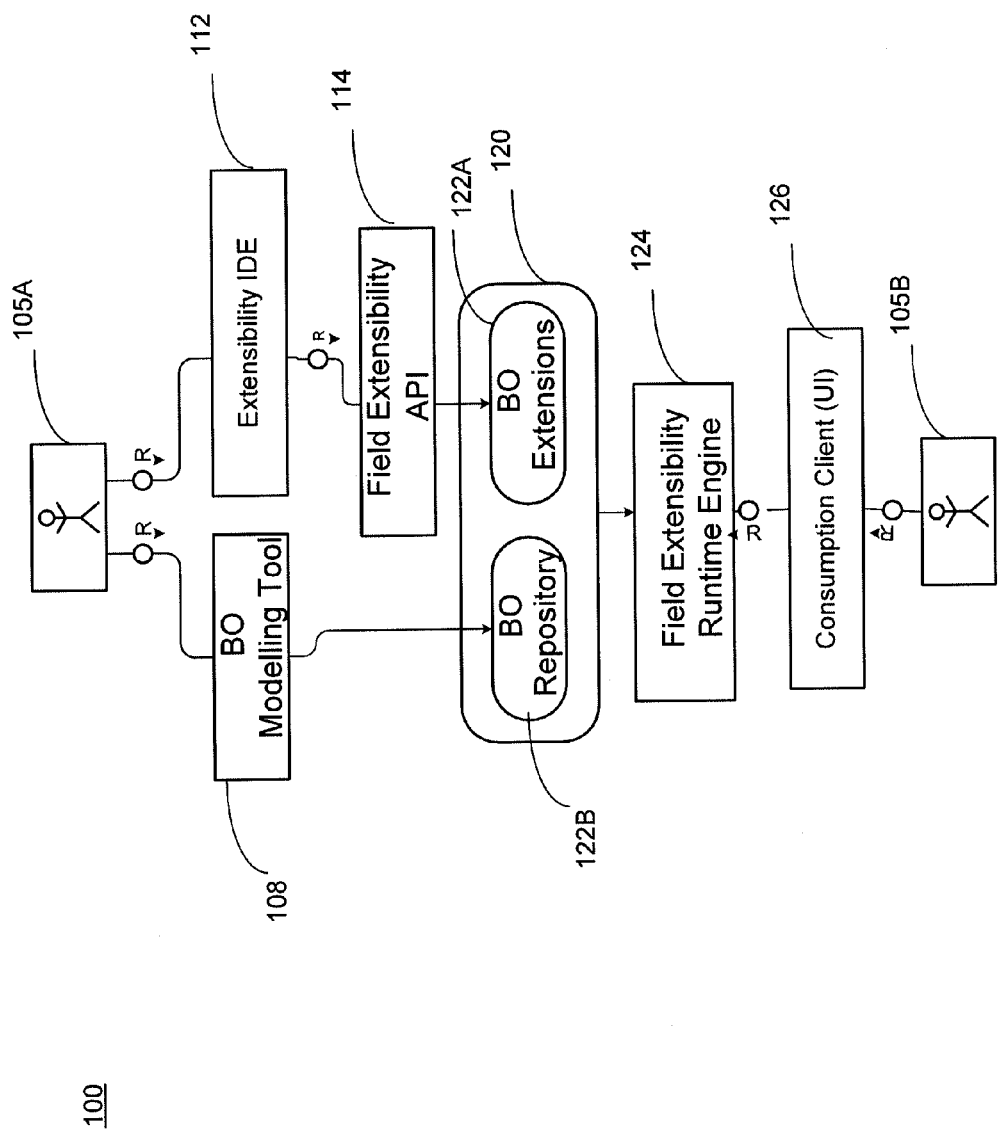
FIG. 1A depicts an exemplary system environment including an extensibility integrated development environment (IDE)

Like labels are used to refer to same or similar items in the drawings.

DETAILED DESCRIPTION

As noted above, although the business application may be delivered to the business entity with a set of business objects developed by the developer of the business application, in some implementations the business application may be required to allow other entities, such as third-party developers, consultants, end-users, and the like, to participate in software development. This software development may include the development of new business objects and the development of extensions to existing business object. An extension refers to modifying (e.g., adding) an aspect of an existing business object to form another, business object. For example, an extended sales business object A1 may be formed by adding a data field, a method, and/or a data type of an existing, sales order business object A.

To facilitate extensions, the subject matter described herein enables the extension of existing business objects. For example, business objects in a standard software package may be extended to allow a third-party software developer or customer to deliver add-ons to business objects. Moreover, an extensibility integrated development environment (IDE) may be provided to facilitate the development of these business object extensions. Moreover, the extensibility integrated development environment (IDE) may be configured to access and thus modify the standard, un-extended fields of business objects, the extended fields of extended business objects, or a combination of both.

In some implementations, there is provided a system for using an extensibility integrated development environment to define extension fields to business objects. The extensibility integrated development environment for defining extension fields may be based on a script-based or a descriptive language, such as a business object extension language.

In some implementations, the extensibility integrated development environment combines the definition of one or more extension fields with their usage in forms and analytical reports used in connection with a user interface. In some implementations, the extensibility integrated development environment may be accessed via a generic application programming interface to allow storage of the extension fields including any corresponding attributes/properties.

FIG. 1A depicts a system 100 including an extensibility integrated development environment 112. System 100 further includes user interfaces 105A-B, a business object modeling tool 108, a field extensibility application programming interface 114, a repository 120, a field extensibility runtime engine 124, and a consumption client user interface 126. The repository 120 further includes storage for business objects 122B and business object extensions 122A.

The user interfaces 105A-B may be implemented as any mechanism enabling interaction with the data and/or methods at system 100. For example, user interface 105A-B may be implemented as a browser or a thin client application. In the implementation of FIG. 1A, the user interface 105A represents a user interface used during design time to develop extensions to business objects, while user interface 105B represents a user interface used during runtime.

During design time, user interface 105A may be used by a user to access the business object modeling tool 108. The business object modeling tool 108 may be configured to allow the developer of a business application to develop and/or access business objects stored in the business object repository 122B. In some implementations, the business object modeling tool 108 may include reporting analytic design time tools, a user interface designer component for designing and configuring reports/forms, a workbench, dashboards, and the like.

The business object modeling tool 108 may provide a mechanism for building (e.g., developing, defining, etc.) models, such as metamodels, and user interface elements used when building forms and analytic reports for the development entities. For example, the business object modeling tool 108 may use a model stored at repository 120 to enable a user to build, during design time, forms, and reports. For example, the defined model may define a report, such as a configured spreadsheet or word processing document, while an analytic report may model a more complex pivot table presented at a user interface. Once defined during design time, these models are then used during runtime to determine the configuration and contents of the form and/or analytic report.

During design time, the user interface 105A may also be used to access the extensibility integrated development environment 112. The extensibility integrated development environment 112 provides a development system configured to operate with a development language or script that facilitates extending the definition of business objects. Moreover, the extensibility integrated development environment 112 may be implemented in accordance with an easy to learn, descriptive language for the definition of extension fields. The extensibility integrated development environment enables business objects and attributes to be extended and stored, via field extensibility application programming interface 114, in business object extensions repository 122A.

During runtime, user interface 105B instantiates a consumption client 126 and sends a message to the field extensibility runtime engine 124. The field extensibility runtime engine 124 executes both the standard (un-extended) business object and the extensions developed using the extensibility integrated development environment 112 and stored in the business object extension repository 122A. The executed business objects may be used to generate, during runtime, forms, analytical reports, and other elements presented as a page at user interface 105. Alternatively, forms and reports may be built as separate instances during design time, and the extensibility IDE extends the forms and reports.

Figure 1B:
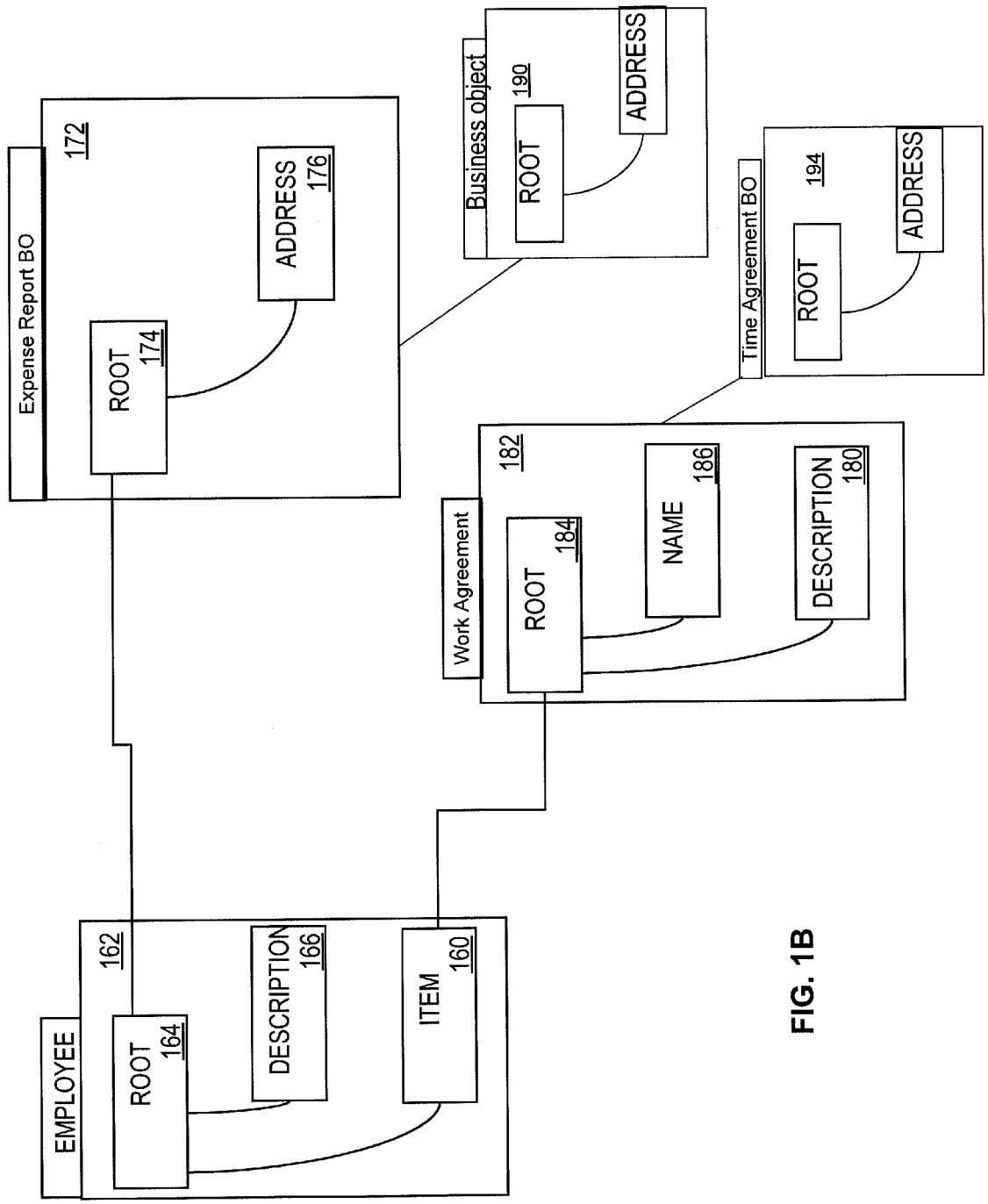
FIG. 1B depicts exemplary business objects.

To illustrate an example of business objects, the following provides a brief description of FIG. 1B. An employee business object 162 can include a root node 164 as well as a description node 166 describing attributes of the employee. An item node 160 can link to another business object, such as for example a work agreement business object 182 that includes a root node 184 as well as a name node 186 and a description node 180 that describes describing aspects of the employee's work agreement. The employee business object 162 can also link to another business object 172, such as for example an expense report business object. The business object 172 may include its own root node 174 and an address node 176 describing attributes of the business object 122. Business object 172 and 182 may also be associated with other business objects, such as for example business objects 194 and 190, as depicted at FIG. 1B. Although FIG. 1B depicts business objects representing employee data and a work agreement, other types of business objects may be used as well.

In the example of FIG. 1B, the business object modeling tool 108 may be used, during design time, to develop the business objects and their attributes. These attributes may include data, methods, such as business logic/methods, data types, and the like. Moreover, the extensibility integrated development environment 112 may be used to extend existing business objects and their existing attributes. To illustrate the extensibility integrated development environment 112, the following description will refer to the examples depicted at FIGS. 1A, 2 and 3.

Figure 2:
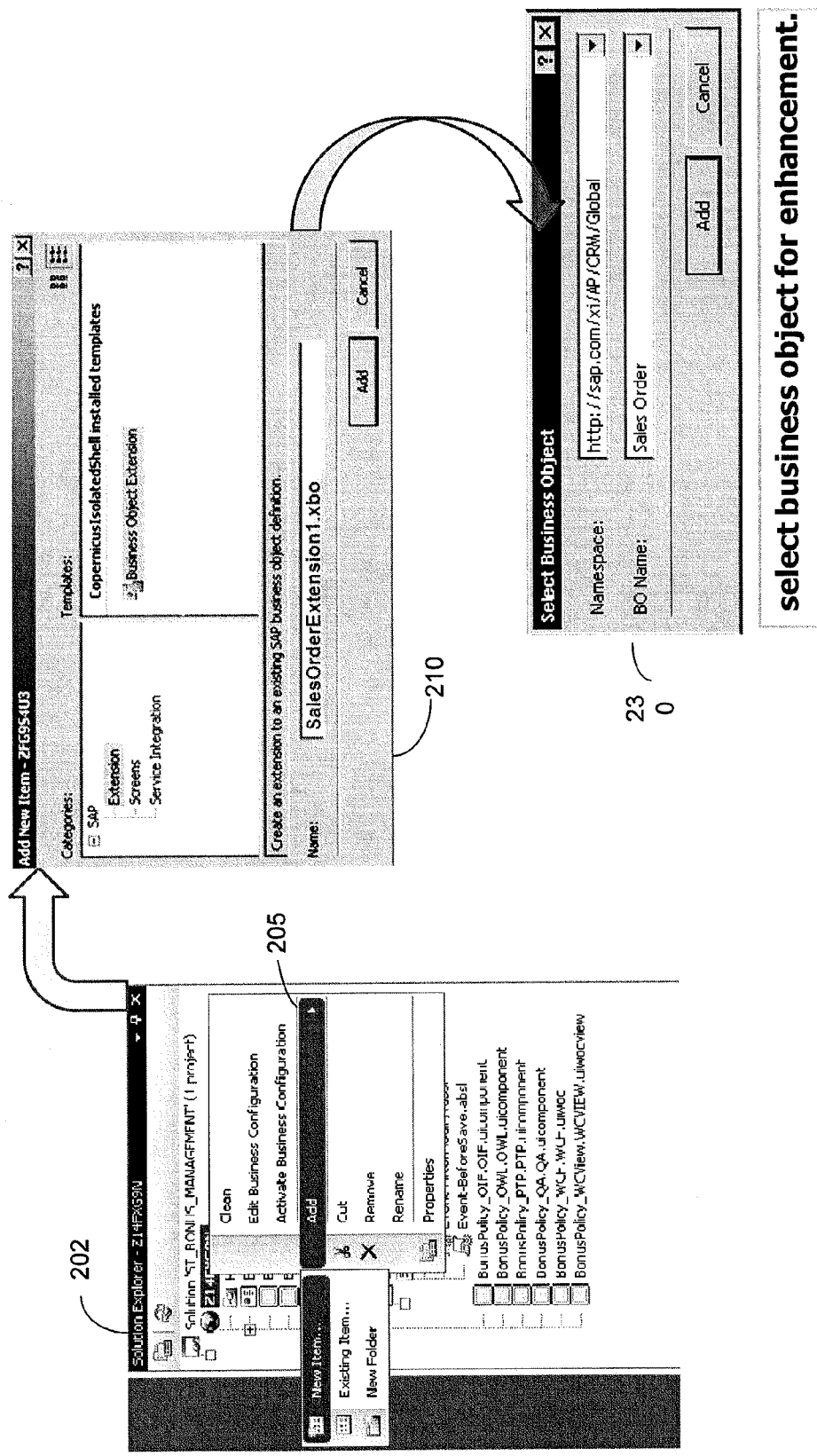
FIG. 2 depicts example pages where a business object is selected for extension.

FIG. 2 depicts a page 202 that may be presented in user interface 105A when the extensibility integrated development environment 112 is accessed. In the example of FIG. 2, the user interface 105A accesses the extensibility integrated development environment 112 and selects adding 205 a business object extension. The extensibility integrated development environment 112 generates page 210, where the added business object extension is named as "SalesOrderExtension1.xbo." Next, a corresponding business object stored in business object repository 122B is selected, so that it can be extended by the extensibility integrated development environment 112. In the example of FIG. 2, a Sales Order business object is selected from the business object repository for extension, which will be extended as the newly added "SalesOrderExtension1.xbo."

Once the development of "SalesOrderExtension1.xbo" is initiated, the extensibility integrated development environment 112, which is accessed via user interface 205A, enables the development of the extension to the selected business object. FIG. 3 depicts that the user interface 105A accesses the extensibility integrated development environment 112 to select the "SalesOrderExtension1.xbo" as depicted by page 310 (which may be presented at user interface 105A).

Next, the extensibility integrated development environment 112 generates page 330 in an editor of the extensibility integrated development environment 112, which is then presented at user interface 105A during design time. In some implementations, the editor is implemented a script-based editor, although other types of editors may be used as well.

Page 330 depicts the Sales Order business object obtained from business object repository 122B and enables the user interface to select nodes for modification so that the selected nodes can be configured with additional attributes. In the example of FIG. 3, the extensibility integrated development environment 112 allows the business object node 332 to be selected for extension and its attributes 334 and 336 to be modified by user interface 105A during design time. For example, user interface 105 may be used to access the extensibility integrated development environment 112 to select only attributes 334, and 336.

Once selected, the user interface 105A and the extensibility integrated development environment 112 enable the definition of extensions to the selected attribute. For example, keyword business object 332 may be selected to allow changes to the business object in the namespace, "SAP.CRM.Global." The attribute 334 may be selected to allow selection of a data type, and attribute 336 may be selected to allow defining an extension, such as the element "ExtItem1:Text." The script-based operating framework of the extensibility integrated development environment 112 enables extensions to be defined readily using descriptive terms as depicted at FIG. 3. Once the highlighted node 332 and attributes 334 and 336 are defined, the extended business object, "SalesOrderExtension1.xbo," is stored by the extensibility integrated development environment 112 in business object repository 122A for use during runtime.

Figure 4:
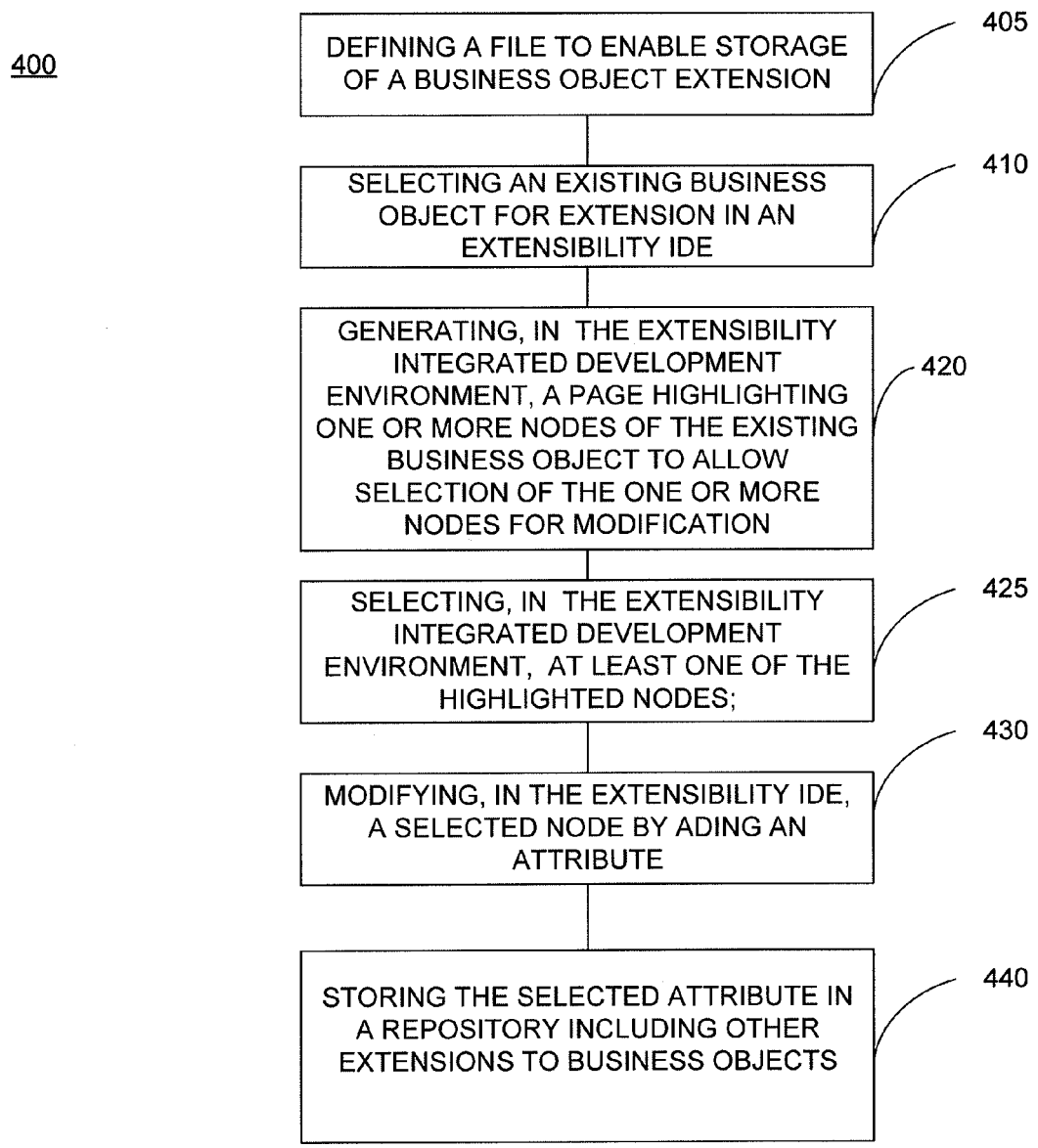
FIG. 4 depicts a process for extending a business object using an extensibility integrated development environment.

FIG. 4 depicts a process for extending a business object. For example, a business object may include a header and one or more nodes, each of which may include one or more business attributes. Some of the nodes may be configured, at design time, as extendable, in which case additional attributes may be added to those business object nodes. An editor may then present via a user interface the extendable nodes as candidates for extension (i.e., adding additional attributes). Furthermore, the editor may store the additional attributes with the node of interest and allow building additional business logic on top of these new attributes, which can be execute during runtime.

At 405, a file including one or more business objects may be defined for storage as an extended business object. For example, during design time, a business object may be configured to allow selection to enable an extension of one or more attributes of the business objects. Moreover, the extensions may be stored in a server-side repository and/or a client side store.

At 410, an existing business object node is selected for extension in the extensibility integrated development environment. For example, a page, such as page 202 depicted at FIG. 2, may be generated by the extensibility integrated development environment, and then presented in user interface 105A. The page may include one or more existing business objects, such as those stored in repository 122B and delivered by the developer of the business application.

At 420, a page is generated highlighting existing business object nodes that have been enabled for modification in the extensibility integrated development environment. For example, the extensibility integrated development environment 112 may generate page 310 and then highlight business object node 330 as having been configured for extension within the extensibility integrated development environment 112. At 425, at least one of the highlighted business objects nodes may then be selected. For example, a user interface presenting page 310 may receive an indication (e.g., a double click and the like) indicating that business object node 330 has been selected.

At 430, the selected node is modified by adding an attribute. For example, the selected node 330 may be modified by adding attributes using the extensibility integrated development environment. For example, a name space of the node 330 may be added at 332 by an end-user and/or third party developer in the extensibility integrated development environment 112. The attributes 334 and 336 may be added to node 330.

At 440, the modified business object node including the added attributed is stored in a repository including other extensions to business objects. For example, the extensibility integrated development environment 112 may store the modified node 330 including added attributes 334 and 336 in the extensibility repository 122A for use during runtime.

Figure 5:
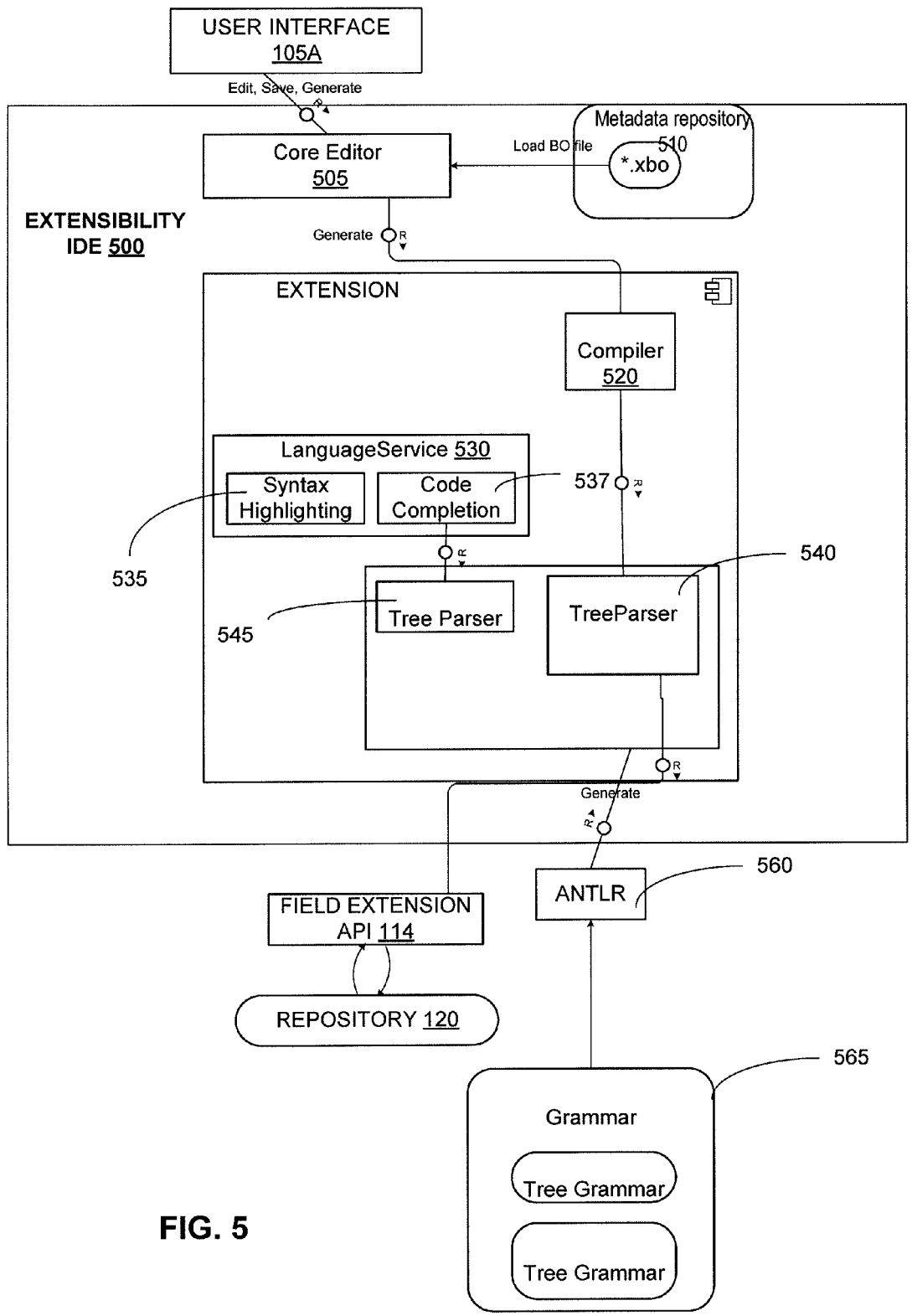
FIG. 5 depicts another exemplary system environment including an extensibility integrated development environment.

FIG. 5 depicts an example implementation using a descriptive language in the extensibility integrated development environment. The extensibility integrated development environment 500 may include a core editor 505 to edit changes (e.g., adding) to an existing business object in order to form the extended business object. The extensibility integrated development environment 500 may further include a metadata repository 510 for accessing content, which is stored as a file with an extension in the metadata repository 510. The extensibility integrated development environment 500 may also include a compiler 520 to compile the extended business object, a language service 530 to highlight attributes that can be extended and to complete code. The extensibility integrated development environment 500 may also include a tree parser 545 and for parsing an abstract syntax tree generated from lower level entities like lexer and parser and for usage by a compiler producing the output. Moreover, the extensibility integrated development environment 500 may include an ANTLR module 560 and grammar module 565 for implementing the grammar of the integrated development environment language. The tree parser works as an abstract tree (e.g., a highly compact representation of a business object extension language content). The abstract tree may be generated from lower level parsers (not part of the picture) using a lexer. The lexer is the lowest level entity and is responsible for recognizing tokens (e.g., syntactical words like 'element' or 'businessobject') from an input stream. The relationship of the tokens may, in some implementations, not be recognized by the lexer, but by the tree parser.

Various implementations of the subject matter described herein may be realized in digital electronic circuitry, integrated circuitry, specially designed ASICs (application specific integrated circuits), computer hardware, firmware, software, and/or combinations thereof. These various implementations may include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device.

These computer programs (also known as programs, software, software applications, or code) include machine instructions for a programmable processor, and may be implemented in a high-level procedural and/or object-oriented programming language, and/or in assembly/machine language. As used herein, the term "machine-readable medium" refers to any computer program product, apparatus and/or device (e.g., magnetic discs, optical disks, memory, Programmable Logic Devices (PLDs)) used to provide machine instructions and/or data to a programmable processor, including a machine-readable medium that receives machine instructions.

To provide for interaction with a user, the subject matter described herein may be implemented on a computer having a display device (e.g., a CRT (cathode ray tube) or LCD (liquid crystal display) monitor) for displaying information to the user and a keyboard and a pointing device (e.g., a mouse or a trackball) by which the user may provide input to the computer. Other kinds of devices may be used to provide for interaction with a user as well; for example, feedback provided to the user may be any form of sensory feedback (e.g., visual feedback, auditory feedback, or tactile feedback); and input from the user may be received in any form, including acoustic, speech, or tactile input.

The subject matter described herein may be implemented in a computing system that includes a back-end component (e.g., as a data server), or that includes a middleware component (e.g., an application server), or that includes a front-end component (e.g., a client computer having a graphical user interface or a Web browser through which a user may interact with an implementation of the subject matter described herein), or any combination of such back-end, middleware, or front-end components. The components of the system may be interconnected by any form or medium of digital data communication (e.g., a communication network). Examples of communication networks include a local area network ("LAN"), a wide area network ("WAN"), and the Internet.

Although a few variations have been described in detail above, other modifications are possible. For example, while the descriptions of specific implementations of the current subject matter use employee data to illustrate the examples above, the current subject matter is applicable to other types of data as well. Furthermore, the phrases "based on" and "based on at least" are used interchangeably herein as both phrases are equivalent. Moreover, although the above description refers to specific products, other products may be used as well. In addition, the logic flows depicted in the accompanying figures and described herein do not require the particular order shown, or sequential order, to achieve desirable results. Other embodiments may be within the scope of the following claims.

What is claimed:

1. A method comprising:
    selecting, at a first page of an extensibility integrated development system, an existing business object for extension in the extensibility integrated development system, wherein the existing business object is selected from a repository including a plurality of business objects delivered with an enterprise resource planning system;
    generating, in the extensibility integrated development system, a second page, wherein the second page includes a plurality of nodes including a first node defined to allow modification and a second node defined to prohibit modification, wherein the first node of the existing business object is highlighted to allow selection of the first node for modification;
    selecting, in the second page of the extensibility integrated development system, at least the first node highlighted to allow modification; and
    modifying, in the second page of the extensibility integrated development system, the selected first node highlighted to allow modification by adding at least one attribute to the selected first node, wherein the extensibility integrated development system provides a script-based editor in which the selected first node is modified using descriptive text to add the at least one attribute, and wherein the script-based editor is coupled to the repository and a language service to provide the highlighting of nodes defined to allow selection.

2. The method of claim 1, wherein the generating further comprises:
    generating, in the extensibility integrated development system, the second page as a hyper text markup language page, and wherein the first node is defined to allow modification during design time.

3. The method of claim 1, wherein the selecting in the extensibility integrated development system, further comprises:
    sending, from a user interface, an indication of a selection of at least the first node, when highlighted.

4. The method of claim 1, wherein the attribute comprises data type attribute.

5. The method of claim 1, wherein the attribute comprises an item.

6. The method of claim 1 further comprising:
    storing, in the repository, the modified first node including the added at least one attribute.

7. A system comprising:
    at least one processor; and
    at least one memory including code, which when executed by the at least one processor provides operations comprising:
    selecting, at a first page of an extensibility integrated development system, an existing business object for extension in the extensibility integrated development system, wherein the existing business object is selected from a repository including a plurality of business objects delivered with an enterprise resource planning system;
    generating, in the extensibility integrated development system, a second page, wherein the second page includes a plurality of nodes including a first node defined to allow modification and a second node defined to prohibit modification, wherein the first node of the existing business object is highlighted to allow selection of the first node for modification;
    selecting, in the second page of the extensibility integrated development system, at least the first node highlighted to allow modification; and
    modifying, in the second page of the extensibility integrated development system, the selected first node highlighted to allow modification by adding at least one attribute to the selected first node, wherein the extensibility integrated development system provides a script-based editor in which the selected first node is modified using descriptive text to add the at least one attribute, and wherein the script-based editor is coupled to the repository and a language service to provide the highlighting of nodes defined to allow selection.

8. The system of claim 7, wherein the generating further comprises:
    generating, in the extensibility integrated development system, the second page as a hyper text markup language page, and wherein the first node is defined to allow modification during design time.

9. The system of claim 7, wherein the selecting in the extensibility integrated development system, further comprises:
    sending, from a user interface, an indication of a selection of at least the first node, when highlighted.

10. The system of claim 7, wherein the attribute comprises data type attribute.

11. The system of claim 7, wherein the attribute comprises an item.

12. A non-transitory computer-readable storage medium including code, which when executed by at least one processor, causes operations comprising:

- selecting, at a first page of an extensibility integrated development system, an existing business object for extension in the extensibility integrated development system, wherein the existing business object is selected from a repository including a plurality of business objects delivered with an enterprise resource planning system;
- generating, in the extensibility integrated development system, a second page, wherein the second page includes a plurality of nodes including a first node defined to allow modification and a second node defined to prohibit modification, wherein the first node of the existing business object is highlighted to allow selection of the first node for modification;
- selecting, in the second page of the extensibility integrated development system, at least the first node highlighted to allow modification; and
- modifying, in the second page of the extensibility integrated development system, the selected first node highlighted to allow modification by adding at least one attribute to the selected first node, wherein the extensibility integrated development system provides a script-based editor in which the selected first node is modified using descriptive text to add the at least one attribute, and wherein the script-based editor is coupled to the repository and a language service to provide the highlighting of nodes defined to allow selection nodes; and
- storing, in a repository, the modified node including the added at least one attribute.

13. The computer-readable storage medium of claim 12, wherein the generating further comprises:

- generating, in the extensibility integrated development system, the second page as a hyper text markup language page, and wherein the first node is defined to allow modification business object, when configured during design time.

14. The computer-readable storage medium of claim 12, wherein the selecting in the extensibility integrated development system, further comprises:

- sending, from a user interface, an indication of a selection of at least the first node, when highlighted.

* * * * *